(No Model.)
J. H. MITCHELL.
DUPLEX DOUGH SHEETING MACHINE.
No. 466,854. Patented Jan. 12, 1892.
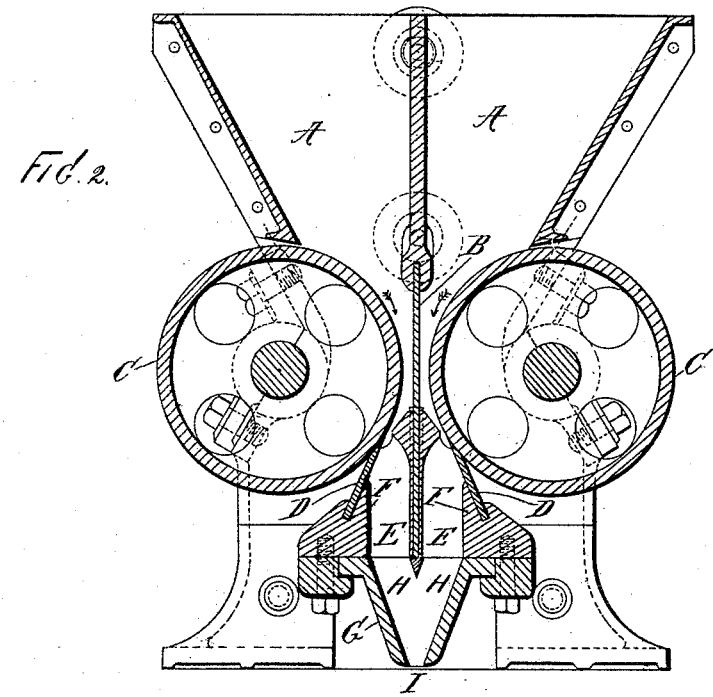
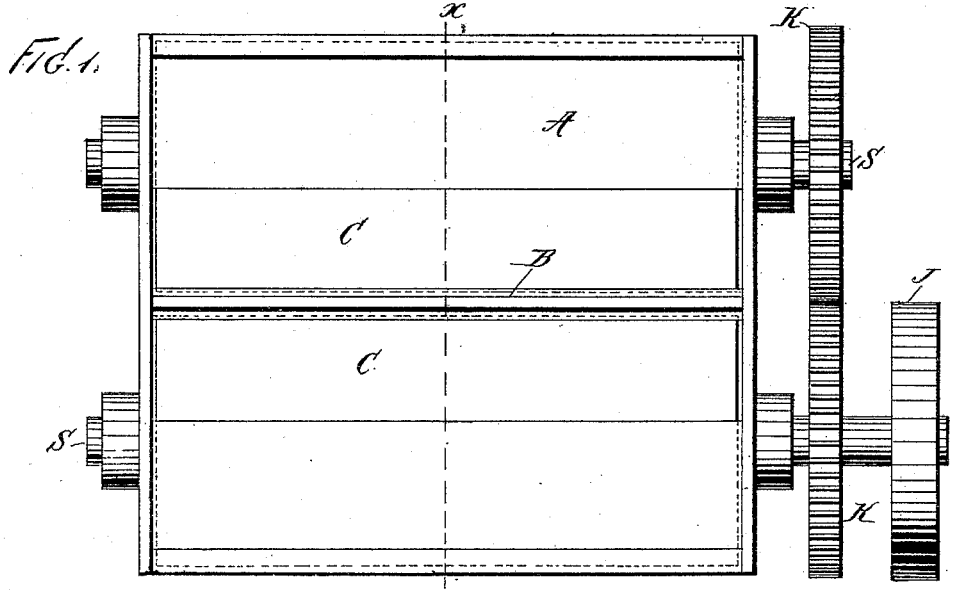
WITNESSES:
INVENTOR
J. H. Mitchell
BY A. M. Pierce.
ATTORNEY.

UNITED STATES PATENT OFFICE.

JAMES HENRY MITCHELL, OF PHILADELPHIA, PENNSYLVANIA.

DUPLEX DOUGH-SHEETING MACHINE.

SPECIFICATION forming part of Letters Patent No. 466,854, dated January 12, 1892.

Application filed July 15, 1891. Serial No. 399,552. (No model.)

*To all whom it may concern:*

Be it known that I, JAMES HENRY MITCHELL, a citizen of the United States, residing at Philadelphia, in the county of Philadelphia and State of Pennsylvania, have invented new and useful Improvements in Duplex Dough-Sheeting Machines, of which the following is a specification.

My invention relates especially to means and mechanism employed for forming dough into sheets or strips, and has for its object the provision of a simple and effective device adapted and arranged to separately sheet and unite two distinct layers, sheets, or strips of dough of different color or material.

To attain the desired end my invention consists, essentially, in certain novel and useful combinations or arrangements of parts and peculiarities of construction and operation, all of which will be hereinafter first fully described, and then pointed out in the claim.

In the drawings, Figure 1 is a plan view of my duplex sheeting-machine. Fig. 2 is a cross-sectional view at line X X of Fig. 1.

Like letters of reference, wherever they occur, indicate corresponding parts in both the figures.

A is the feed-hopper, divided centrally by a partition-plate B.

C C are two compressing-rollers, arranged to revolve toward each other, as indicated by the arrows in Fig. 2.

D D are knife-plates, adapted and arranged to strip the dough from the rollers C.

E E are the two portions of a receiving-chamber located below the dividing-plate B, the walls of said chamber being held in place by a bed or frame F, constructed to receive a forming-die G, open at H at top and having a discharge-opening I at the botton.

J is a driving-pulley mounted upon the shaft S of one of the rollers C, and K K are the gears upon the said roller-shafts, arranged to mesh with each other, for driving said rollers in unison.

When constructed and arranged substantially in accordance with the foregoing description, the operation of my duplex dough-sheeting machine is as follows: Two doughs of different color or material are placed one each side of the dividing-plate within the hopper and the machine started. The dough is forced down into the chamber E, each kind of dough passing separately into said chamber and therefrom into the forming-die G, where they are united, passing therefrom onto any suitable carrying-belt in two distinct layers.

Having now fully described my invention, what I claim as new therein, and desire to secure by Letters Patent, is—

A duplex dough-sheeting machine in which is comprised a double dough-hopper, compressing-rollers projecting into said hopper at each side and having a division therebetween, and a chamber below said rollers adapted and arranged to receive two separate sheets of dough, permitting them to be compressed together at their meeting sides and then deliver the single sheet, substantially as shown and described.

JAMES HENRY MITCHELL.

Witnesses:
A. M. PIERCE,
ISABEL CHESTER.